United States Patent
Yuan et al.

(10) Patent No.: US 7,440,244 B2
(45) Date of Patent: Oct. 21, 2008

(54) SELF-TRIGGERING SUPERCONDUCTING FAULT CURRENT LIMITER

(75) Inventors: Xing Yuan, Albany, NY (US); Kasegn Tekletsadik, Rexford, NY (US)

(73) Assignee: SuperPower, Inc.

( * ) Notice: Subject to any disclaimer, the term of this patent is extended or adjusted under 35 U.S.C. 154(b) by 0 days.

(21) Appl. No.: 11/097,560

(22) Filed: Apr. 2, 2005

(65) Prior Publication Data
US 2006/0221517 A1    Oct. 5, 2006

(51) Int. Cl.
*H02H 3/00* (2006.01)

(52) U.S. Cl. .............................. 361/19; 361/8
(58) Field of Classification Search ............... 361/19, 361/93.7–93.9, 8–10; 335/216
See application file for complete search history.

(56) References Cited

U.S. PATENT DOCUMENTS

| | | | | |
|---|---|---|---|---|
| 5,225,957 | A * | 7/1993 | Tsurunaga .................... | 361/19 |
| 5,432,666 | A | 7/1995 | Hodge | |
| 5,475,560 | A * | 12/1995 | Onishi et al. ................ | 361/141 |
| 5,546,261 | A * | 8/1996 | Yoshida et al. ............... | 361/19 |
| 5,617,280 | A * | 4/1997 | Hara et al. .................... | 361/19 |
| 5,694,279 | A * | 12/1997 | Mumford ..................... | 361/19 |
| 6,043,731 | A * | 3/2000 | McDougall et al. ......... | 338/32 S |
| 6,236,545 | B1 * | 5/2001 | McDougall et al. .......... | 361/19 |
| 6,239,957 | B1 * | 5/2001 | McDougall et al. .......... | 361/19 |
| 6,275,365 | B1 | 8/2001 | Kalsi | |
| 6,664,875 | B2 * | 12/2003 | Yuan et al. ................... | 335/216 |
| 6,809,910 | B1 * | 10/2004 | Yuan et al. .................... | 361/19 |
| 6,947,265 | B2 * | 9/2005 | Mine et al. .................... | 361/19 |
| 6,958,893 | B2 * | 10/2005 | Yuan ............................ | 361/19 |
| 2005/0047033 | A1 * | 3/2005 | Yuan ............................ | 361/19 |

* cited by examiner

*Primary Examiner*—Michael J Sherry
*Assistant Examiner*—Danny Nguyen
(74) *Attorney, Agent, or Firm*—George L. Rideout, Jr.

(57) ABSTRACT

A modular and scaleable Matrix Fault Current Limiter (MFCL) that functions as a "variable impedance" device in an electric power network, using components made of superconducting and non-superconducting electrically conductive materials. The matrix fault current limiter comprises a fault current limiter module that includes a superconductor which is electrically coupled in parallel with a trigger coil, wherein the trigger coil is magnetically coupled to the superconductor. The current surge doing a fault within the electrical power network will cause the superconductor to transition to its resistive state and also generate a uniform magnetic field in the trigger coil and simultaneously limit the voltage developed across the superconductor. This results in fast and uniform quenching of the superconductors, significantly reduces the burnout risk associated with non-uniformity often existing within the volume of superconductor materials. The fault current limiter modules may be electrically coupled together to form various "n" (rows)×"m" (columns) matrix configurations.

4 Claims, 7 Drawing Sheets

SELF-TRIGGERING SUPERCONDUCTING FAULT CURRENT LIMITER

The U.S. government has a paid-up license in this invention and the right in limited circumstances to require to the patent owner to license others on reasonable terms as provided for in the terms of Contract No. DE-FC36-03G013033 awarded by the Department of Energy.

BACKGROUND

The invention relates generally to a current limiter and more specifically to a superconducting fault current limiter.

Current limiting devices are critical in electric power transmission and distribution systems. For various reasons such as lightening strikes, short circuit conditions can develop in various sections of a power grid causing sharp surge in current. If this surge of current, which is often referred to as fault current, exceeds the protective capabilities of the switchgear equipment deployed throughout the grid system, it could cause catastrophic damage to the grid equipment and customer loads that are connected to the system.

Superconductors, especially high-temperature superconducting (HTS) materials, are well suited for use in a current limiting device because of their intrinsic properties that can be manipulated to achieve the effect of "variable impedance" under certain operating conditions. A superconductor, when operated within a certain temperature and external magnetic field range (i.e., the "critical temperature" ($T_c$) and "critical magnetic field" ($H_c$) range), exhibits no electrical resistance if the current flowing through it is below a certain threshold (i.e., the "critical current level" ($J_c$)), and is therefore said to be in a "superconducting state." However, if the current exceeds this critical current level the superconductor will undergo a transition from its superconducting state to a "normal resistive state." This transition of a superconductor from its superconducting state to a normal resistive state is termed "quenching." Quenching can occur if any one or any combination of the three factors, namely the operating temperature, external magnetic field or current level, exceeds their corresponding critical level. Mechanisms, using any one or any combination of these three factors, to induce and/or force a superconductor to quench is usually referred to as a trigger mechanism.

A superconductor, once quenched, can be brought back to its superconducting state by changing the operating environment to within the boundary of its critical current, critical temperature and critical magnetic field range, provided that no thermal or structural damage was done during the quenching of the superconductor. HTS material can operate near the liquid nitrogen temperature 77 degrees Kelvin (77K) as compared with low-temperature superconducting (LTS) material that operates near liquid helium temperature (4K). Manipulating properties of HTS material is much easier because of its higher and broader operating temperature range.

For some HTS materials, such as bulk Bismuth-Strontium-Calcium-Copper-oxide (BSCCO) elements, there often exists, within the volume of the superconductor, non-uniform regions resulting from the manufacturing process. Such non-uniform regions can develop into the so-called "hot spots" during the surge of current that exceeds the critical current level of the superconductor. Essentially, at the initial stage of quenching by the current, some regions of the superconductor volume become resistive before others do due to non-uniformity. A resistive region will generate heat at these non-uniform regions from its associated $i^2r$ loss. If the heat generated could not be propagated to its surrounding regions and environment quickly enough, the localized heating will damage the superconductor and could lead to the breakdown (burnout) of the entire superconductor element.

U.S. Pat. No. 6,664,875, issued on Dec. 16, 2003, entitled, "Matrix-Type Superconducting Fault Current Limiter" assigned to the assignee of the present invention, incorporated by reference in its entirety, uses a mechanism that combines all three of the quenching factors of the superconductor, namely current, magnetic field and temperature, to achieve a more uniformed quenching of the superconductor during current limiting. This so-called MFCL concept can dramatically reduce the burnout risks in bulk superconducting materials due to the non-uniformity which exists in the superconductor volume. In addition, the detection of a fault and subsequent activation of the current-limiting impedance of the MFCL are done passively by the built-in matrix design, without assistance of active control mechanisms. This makes a fault current limiter based on the MFCL concept more easily designed, built and operated for a wide range of potential current-limiting applications. It is desirable to have an MFCL with at least the above listed characteristics that is simple in design and reliability.

BRIEF DESCRIPTION

It is an objective of this invention to provide a passive scalable MFCL design that achieves fast quenching using magnetic field as a main trigger mechanism and a shunt impedance to provide a significant degree of flexibility in achieving current limiting purposes of the MFCL, both the trigger mechanism and the shunt impedance are electrically connected in parallel with a superconducting element.

Briefly, in accordance with one embodiment of the present invention, a superconducting fault current limiter is provided which has at least one HTS element coupled in parallel with an inductive component and also coupled in parallel with a shunt. The inductive component, herein referred to as trigger coil, is electrically connected in parallel with a superconductive element and a shunt element to form the base structure of the fault current limiter. The trigger coil is physically disposed around the HTS in such a way so that the magnetic field generated by the current in the trigger coil will be uniformly applied to the HTS. Under normal operating condition, the superconducting element will have no resistance and thus all current will flow through it. Consequently, there is no voltage drop across the whole arrangement and the parallel connected shunt and trigger coil will have no current flowing through them. Once there is a fault however, the current surge will exceed the critical current level of the superconductor element and cause it to quench immediately, thus generating a sufficiently large voltage drop across the shunt and trigger coil which results in part of the overall current being diverted into the shunt and trigger coils. The resulting current in the trigger coil will generate a magnetic field that is uniformly applied to the superconductor which acts to further quench the superconductor uniformly. The shunt will act to limit the voltage generated by the superconductor and share the total current to insure that the superconductor does not overheat and can quickly return to its normal state once the fault has been removed.

Using the arrangement described above as a base module, a matrix current limiter can be configured to have at least one row and at least one column of such modules, wherein each module is coupled in parallel with each other module in each column and each column is coupled in series with each other column. The modular nature of the MFCL makes it adaptable to high voltage and/or high current operating requirements of the power system to which it connects.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

U.S. patent application Ser. No. 10/877,838, entitled "Superconducting Matrix Fault Current Limiter With Current-Driven Trigger Mechanism", filed on Jun. 25, 2004, assigned to the assignee of the present invention, which is a Continuation-In-Part of U.S. patent application Ser. No. 10/609,969, filed on Jun. 30, 2003, are both herein incorporated by reference in their entirety. These applications describe MFCL designs which are modular and scalable that functions as a "variable impedance" using components made of superconducting as well as conventional electrically conductive materials.

Figure 1:
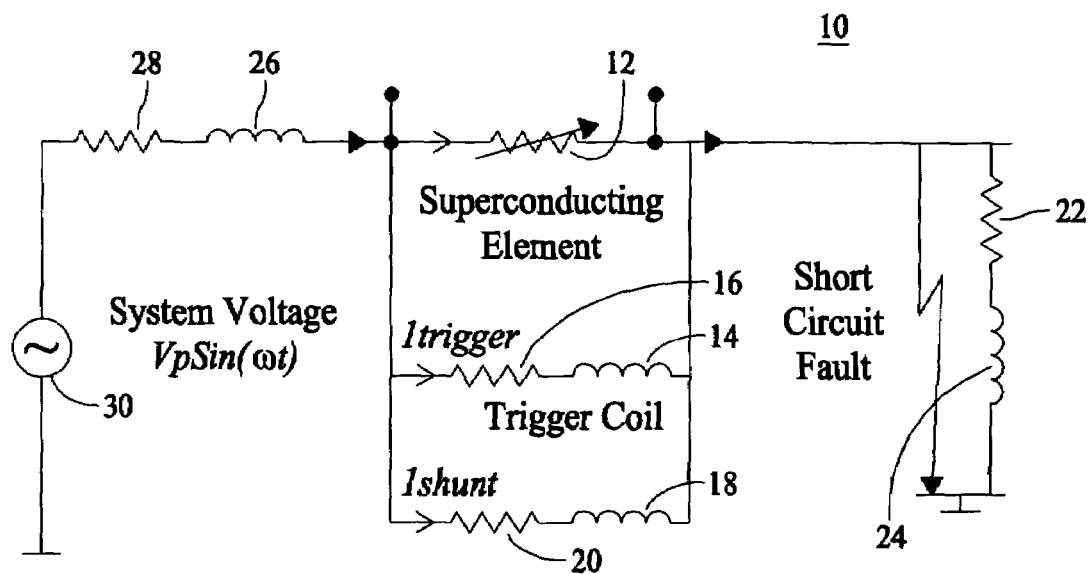
FIG. 1 illustrates a simplified electrical schematic of a single phase of a three-phased electrical power transmission and distribution system and a basic fault current limiter of the present invention.

FIG. 1 is a simplified schematic single phase line diagram of a three-phased alternating current (AC) electrical power system 10 of the present invention under a short circuit fault condition. This diagram illustrates the system power source 30, line resistance 28, line inductance 26, and load impedance which usually comprises a resistance 22 and/or an inductance 24. In series with system power source 30 and load 22/24 is a fault current limiter 32 of the present invention in its basic electrical configuration. The fault current limiter 32 comprises a superconducting element 12 that behaves as a variable resistor, a trigger coil inductance 14, a trigger coil resistance 16, a shunt resistance 20, and a shunt inductance 18. The shunt resistance 20 and inductance 18 are electrically coupled in series and the two together are coupled in parallel with superconducting element 12. The trigger coil resistance 16 and trigger coil inductance 14 are electrically coupled in series and the two are coupled in parallel to superconducting element 12.

Figure 2:
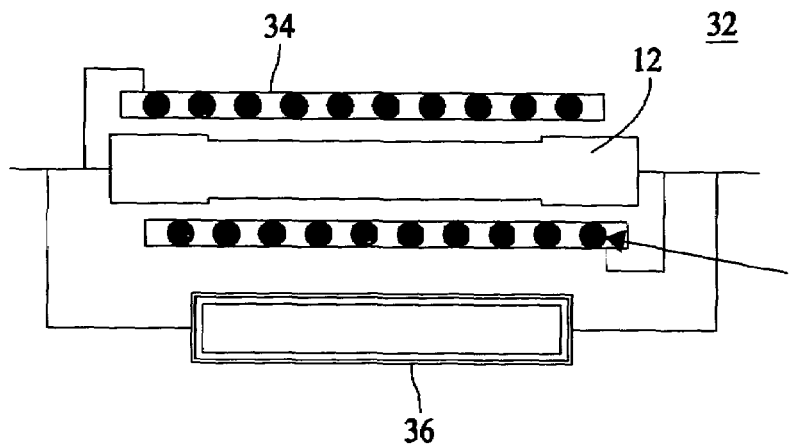
FIG. 2 illustrates a simplified physical layout of a basic fault current limiter of the present invention.

FIG. 2 illustrates a simplified physical layout of a fault current limiter 32 of the present invention. A trigger coil 34 physically envelops superconducting element 12 in such a fashion as to cause a uniform magnetic field throughout the length of superconductor 12 when current flows through trigger coil 34. Trigger coil 34 comprises a trigger resistance 16 and trigger inductance 14, as illustrated in FIG. 1. Trigger coil 34 is electrically coupled in parallel with superconducting element 12. Shunt 36 is electrically coupled in parallel with superconducting element 12. Shunt 36 comprises shut resistance 20 and shunt inductance 18. Superconducting element 12 is in a configuration selected from the group including a bar, a rod, a tube, a plate, a bifilar coil, or any other non or low-inductive forms. Trigger coil 34 is made of electrically conductive materials, such as copper, and in configuration selected from the group including helically wound solenoid coils, racetrack coils or saddle coils. The superconductors are maintained at a superconducting state by being cooled below their critical temperature with cooling provided by either liquid or gaseous coolant within the cryostat or by external cooling mechanisms such as cryocoolers or combinations of both.

Shunt 36 is used to limit the maximum voltage drop that may develop across superconductor 12 after it quenches. A portion of the fault current will be shunted away from superconductor element 12 into trigger coil 34 and shunt 36 thus reducing the heat generated in the superconductor in the form of $i^2r$ losses to protect against potential thermal and mechanical damage. This also improves the thermal recovery of the superconductor 12 and therefore the recovery time of the fault current limiter 32 once the fault is removed, since the voltage developed is limited by the shunt it also limits the temperature rise of superconducting element 12 during its quenching and subsequent states.

Figure 3:
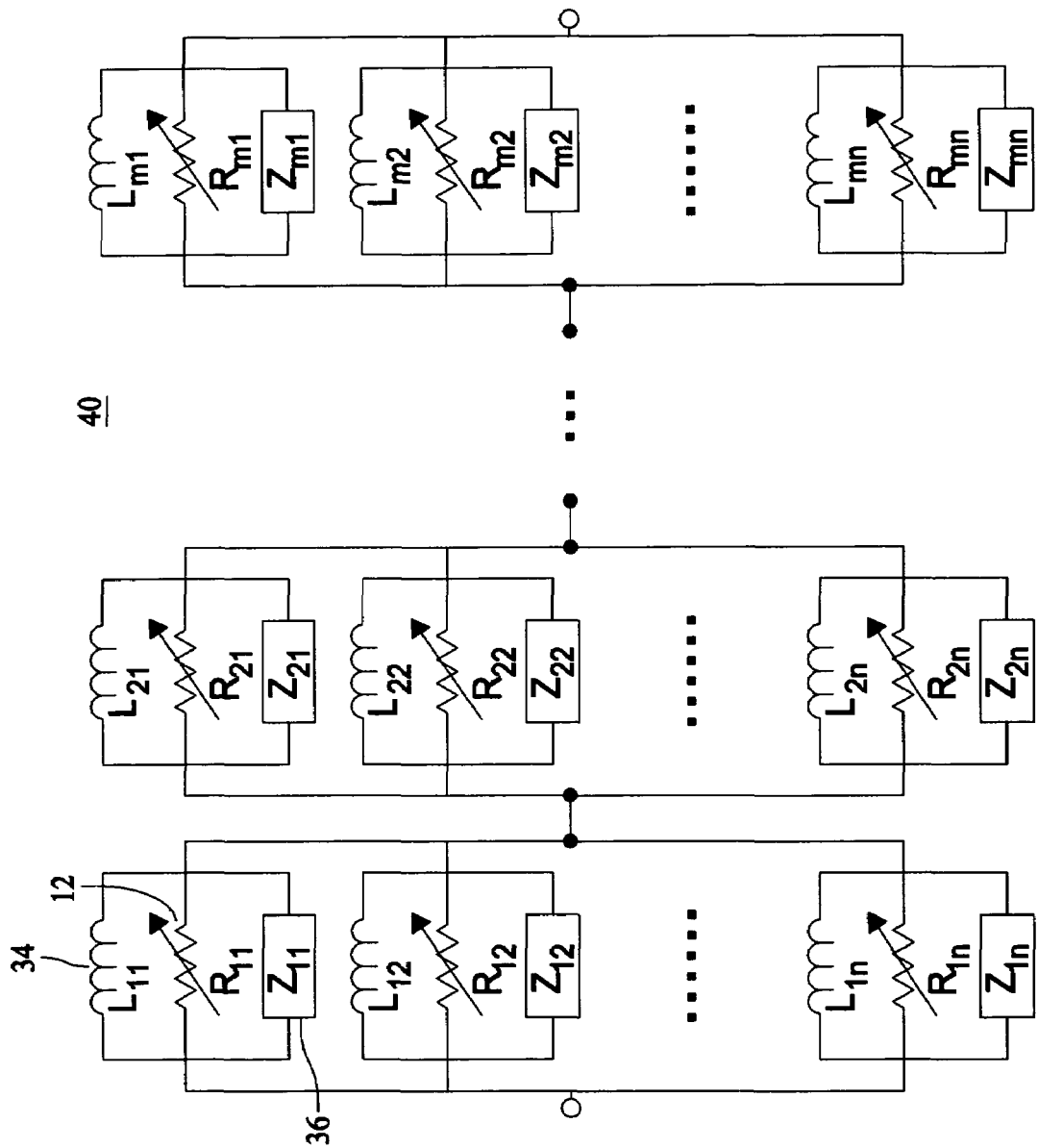
FIG. 3 illustrates an embodiment of the matrix arrangement of present invention to form a matrix fault current limiter (MFCL) wherein a shunt impedance is coupled in parallel with a trigger coil impedance and a superconducting element within each fault current limiter module of the MFCL of the present invention.

FIG. 3 illustrates an exemplary embodiment of the present invention in a configuration of Matrix Fault Current Limiter (MFCL) 40 comprising "n" rows and "m" columns of the basic current limiter 32 described in FIG. 1 and FIG. 2. In row 1, column 1, trigger coil 34 is depicted by inductor $L_{11}$, superconducting element 12 is depicted by variable resistor $R_{11}$, and shunt 36 is depicted by impedance $Z_{11}$. In row 2, column 1, trigger coil 34 is depicted by inductor $L_{12}$, superconducting element 12 is depicted by variable resistor $R_{12}$, and shunt 36 is depicted by impednace $Z_{12}$. In row "m", column 1, trigger coil 34 is depicted by inductor $L_{m1}$, superconducting element 12 is depicted by variable resistor $R_{m1}$, and shunt 36 is depicted by impedance $Z_{m1}$. Correspondingly, in row "n" column m, trigger coil 34 is depicted by inductor $L_{mn}$, superconducting element 12 is depicted by variable $R_{mn}$, and shunt 36 is depicted by impedance $Z_{mn}$. It logically follows from this arrangement of basic fault current limiters that a matrix fault current limiter can be highly modular and scalable so the MFCL can be designed to size to accommodate various fault current limiting application requirements.

Figure 4:
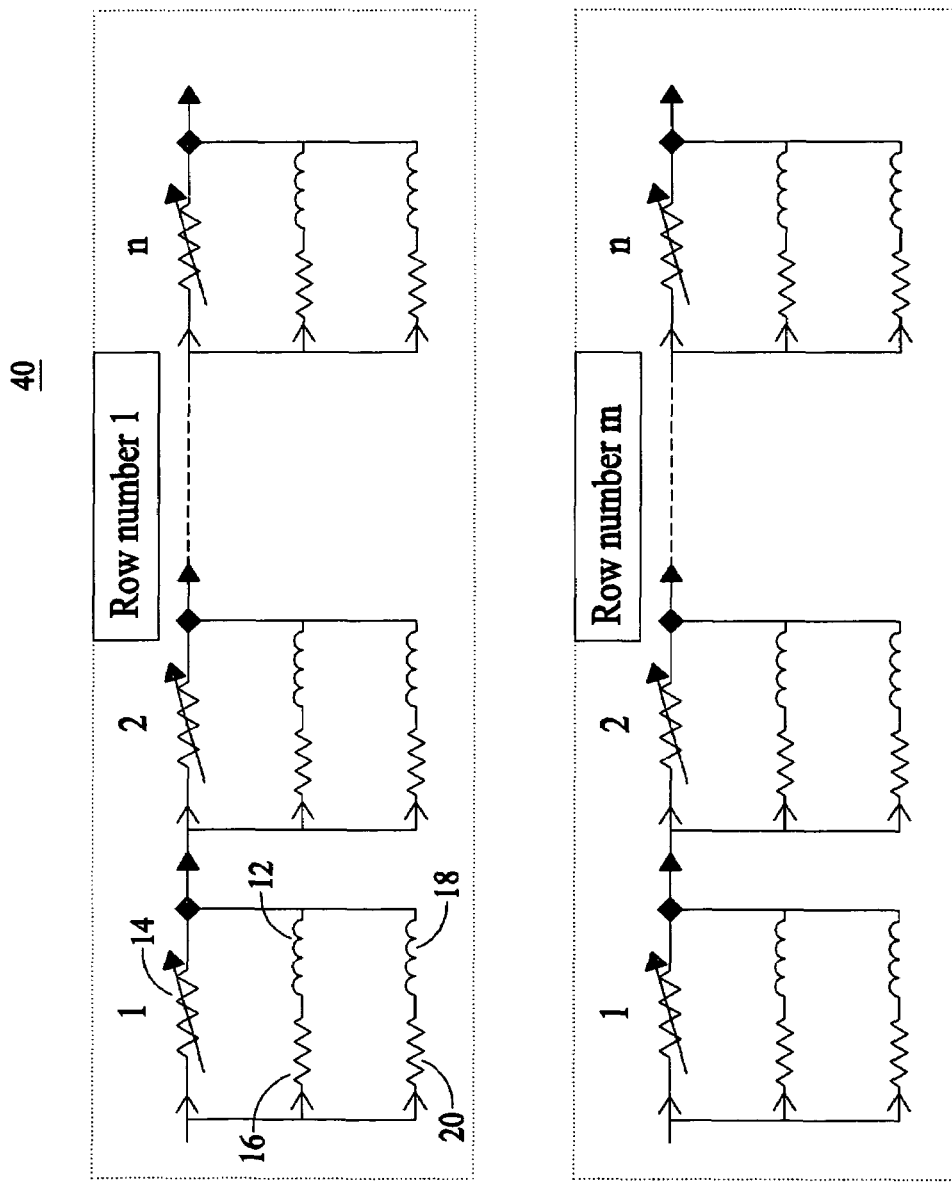
FIG. 4 illustrates another embodiment of the matrix fault current limiter arranged in an "m" (row)×"n" (column) matrix configuration of the present invention.

FIG. 4 provides an alternate electrical connection scheme from the embodiment of MFCL 40 depicted in FIG. 3. Here, "n" number of basic fault current limiters 32 is electrically connected in series to form one row. Then "m" number of such rows are electrically connected in parallel to form a "n×m" matrix configuration of an alternate MFCL embodiment.

Figure 5:
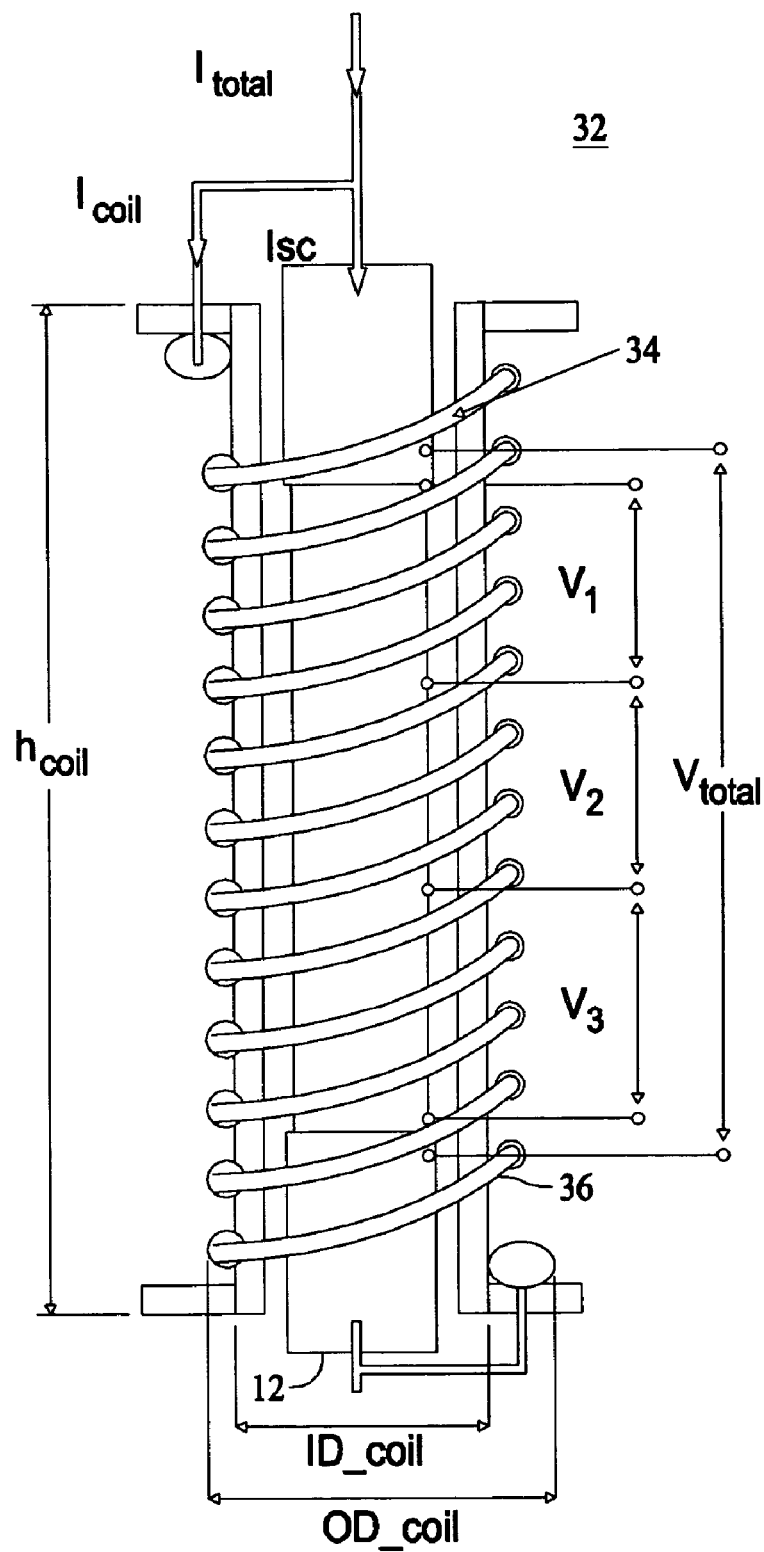
FIG. 5 illustrates another embodiment of the basic fault current limiter of the present invention, and the physical layout of voltage and current sensing points along a test setup of such a limiter.

FIG. 5 illustrates an alternate embodiment of the physical layout of the basic fault current limiter 32 of the present invention. This configuration does not have a shunt connected in parallel with the superconductor 12 and trigger coil 34. Trigger coil 34 is magnetically coupled to and wound around superconductor 12 to encompass the entire superconducting portion of superconducting element 12, so as to generate a uniform magnetic field along the length of superconductor 12. In the example illustrated in FIG. 5 trigger coil 34 has "N" turns. The inside diameter of trigger coil 34 is $ID_{coil}$. The outside diameter of trigger coil 34 is $OD_{coil}$. The cross sectional area of trigger coil 34 is $A_{coil}$. Superconducting element 12 has a length of $h_{coil}$, and has a critical current $I_c$. A magnetic field "B" generated by the coil is a function of ($I_{coil}$, N, $ID_{coil}$, $OD_{coil}$ and $h_{coil}$). The trigger coil 34 impedance "Z" is a function of (N, $ID_{coil}$, $OD_{coil}$, $h_{coil}$, and $A_{coil}$). The superconducting element 12 operates in the superconducting temperature range of around 77° K., and the separation between voltage-taps $V_1$, $V_2$ and $V_3$, of superconducting element 12 are about equal distance. Voltage taps are used along the superconductor length to measure voltage differences $V_1$, $V_2$ and $V_3$, in order to investigate the uniformity voltage distribution during a short-circuit fault condition. The total voltage across superconductor element 12 $V_{total}$ is the sum of voltages $V_1$, $V_2$ and $V_3$.

Figure 6:
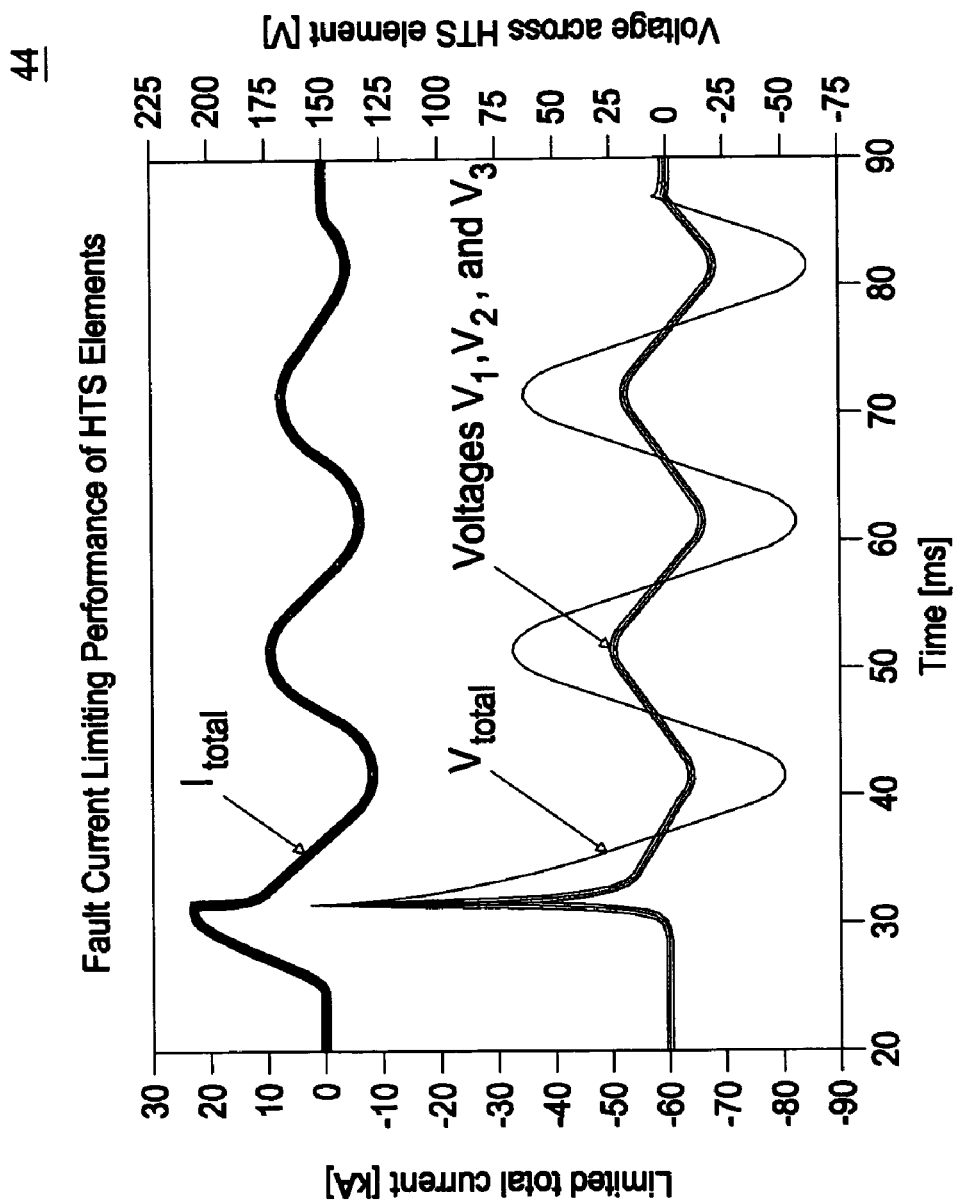
FIG. 6 illustrates a graphical current and voltage plot of one test result of the superconducting fault current limiter identified in FIG. 5 during a fault current limiter experiement.

FIG. 6 is a plot 44 of the current and voltage measurement results of the alternate embodiment of present invention as described in FIG. 5, during a short-circuit test under a system voltage of 480 volts AC. The total superconducting element 12 voltage $V_{total}$ settles to a steady value of around condition of 60 volts peak. Each voltage $V_1$, $V_2$, and $V_3$ is approximately 20 volts peak. The current $I_{total}$ settles to a steady value of about 10 kA in peak magnitude. The results demonstrates that the voltage during a short-circuit fault is very uniform across the entire length of superconducting element 12.

The modular nature of MFCL 40 makes it extremely adaptable to high voltage and/or high current operating requirements of power system 10 to which it connects. For high voltage applications, the total voltage are divided amongst the multiple columns of a matrix assembly with therefore substantially simplifies the dielectric design of the MFCL to meet various high voltage insulation requirements. Furthermore, combinations of different number of rows and columns can be used to address applications that have both high voltage and high current operating requirements and different current limiting requirements.

The operation of the electrical power system 10 and an matrix fault current limiter 40 is now described. The combined superconductor critical current level corresponds to the "n" number of rows of MFCL 40 during normal operation is designed to be no less than the peak of the nominal AC operating current plus any over-current capacity required by the power system 10. Fault current limiter module in each row of MFCL 40 will see about "1/n" of this total system current. Within fault current limiter 32 each trigger coil 34 and shunt 36 is designed to have low impedance which is substantially lower than that of the quenched resistance of superconductor 12. The MCFL 40 exhibits no electrical resistance during normal operation of power system 10 since the system current is below its critical current level, and will result in no voltage drop across the MFCL device 40. Therefore, no current will be diverted to the trigger coils 34 and shunt 36. Therefore, no power losses will be generated in the trigger inductors 34 and shunt 36 and no power losses will be generated during normal operation.

When a fault occurs in electrical power system 10, the surge current flowing through MFCL 40 increases to multiples of the normal operating current. Consequently, superconductor 12 will begin to transition from a superconducting state to a normal resistive state also called "quenching". The resistance generated by superconductor 12 in this quench state will cause a voltage to be generated across the superconductor 12. This voltage will generate a current in both the shunt 36 and trigger coil 34 since they're both electrically coupled in parallel to superconductor 12. The current generated in trigger coil 34 will generate a uniform magnetic field that is applied throughout the entire length of the superconducting element 12. The magnetic field increases dramatically with the fault current rise and significantly reduces the critical current level of superconductor 12, forcing the superconductors 12 to transition immediately into a quenched state. Once the initial quench starts, the subsequent $i^2r$ heating within superconductor 12 also contributes to the quenching process. Because the magnetic field generated in the trigger coil 34 is designed to be uniform, the entire volume of superconductor 12 is now under a uniformly quenched magnetic field, reducing any hot spot burnout risk due to non-uniformity existing within the superconducting material. The apparatus and method of generating a uniform magnetic field in a superconductor is described in more details in U.S. patent application Ser. No. 10/606,467, filed on Jun. 26, 2003, assigned to the assignee of the present invention, and herein incorporated by reference in its entirety.

Overall, all three factors, namely the current surge, the temperature rise, and the external magnetic field, all work to promote fast and uniform quenching of the superconductor 12 and to prevent burnout due to material defects. The modularity of the MFCL 40 provide built in redundancy in the design such that a failure of any individual superconductor 12 in an MFCL 40 does not result in the failure of the entire device.

Figure 7:
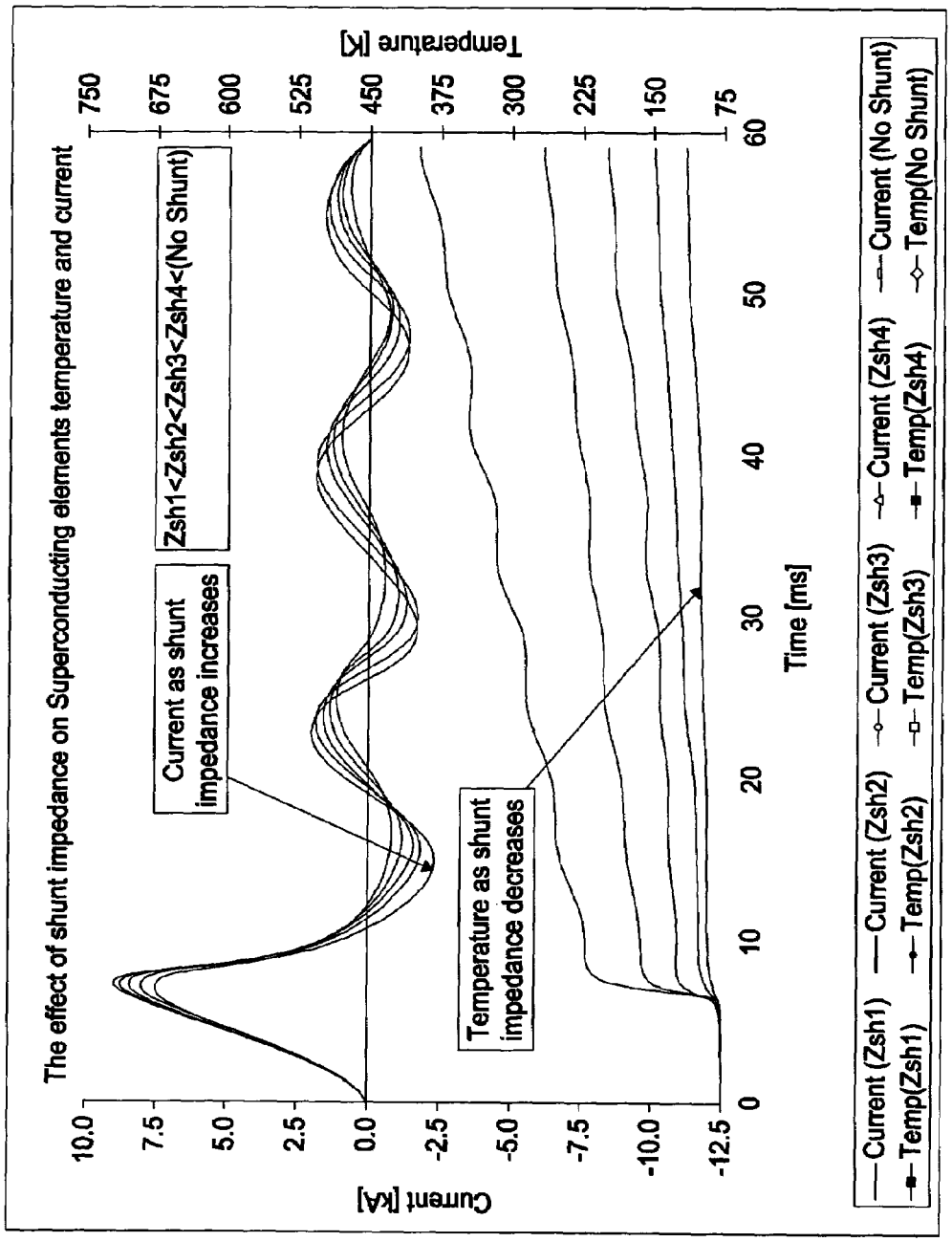
FIG. 7 illustrates a graphical plot of the simulated results of shut impedance effect on superconductor temperature and current limiting performance of the fault current limiter the present invention.

FIG. 7 illustrates a plot 46 of the calculated results of effects of different shunt 35 impedance have on the temperature and current limiting performance of the basic fault current limiter identified in FIG. 1. Parameters identified in FIG. 5 are used to generate these calculation results. Based on the results illustrated in the plot, as the shunt impedance decreases from infinite ohms (without a shunt 36) to zero ohms (superconductor 12 is electrically shorted out)the temperature of superconducting element 12 changes from approximately 370° K. to 75° K. From these calculations it is evident that shunt 36 acts to reduce temperature in superconducting element 12 thus helping to reduce $i^2r$ losses in superconductor 12 during a fault condition, thus reducing the thermal and mechanical stress it experiences.

Figure 8:
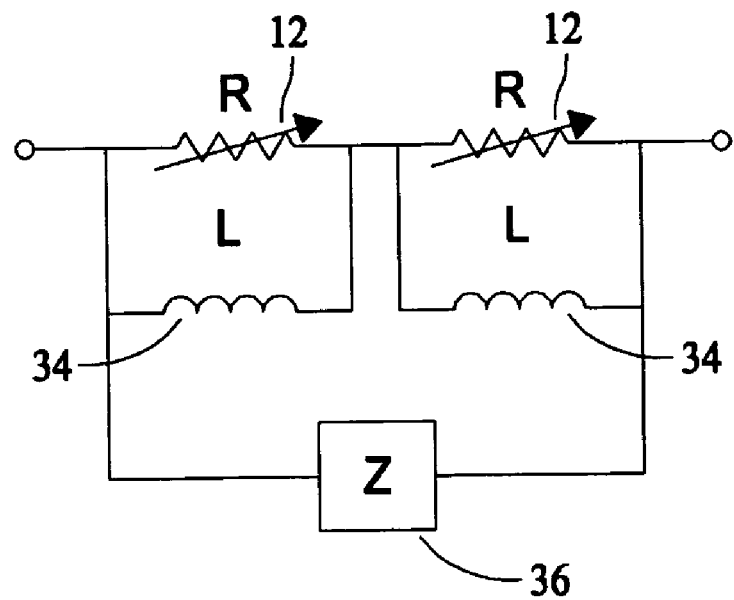
FIGS. 8 and 9 illustrate exemplary embodiments of the present inventions where various combinations of shunt and trigger coils may be used for a given selection of superconductors.
Figure 9:
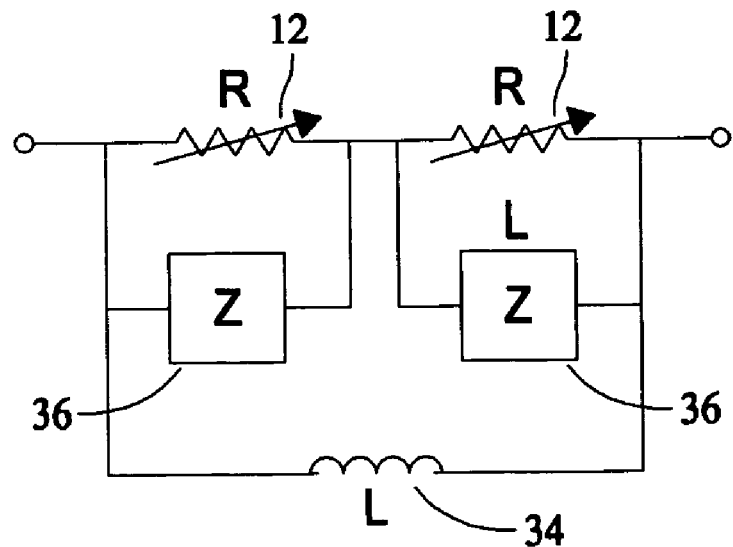

FIG. 8 illustrates an alternative embodiment of the present invention wherein a single shunt is electrically coupled in parallel with at least one superconductor 12 and trigger coil 34. Correspondingly, FIG. 9 illustrates a further alternative embodiment of the present invention wherein a single trigger coil 34 is electrically coupled in parallel with at least one superconductor 12 and shunt 36. It is further follows that the MFCL 40 of the present invention may be electrically coupled in parallel with another MFCL 40 or alternatively may be coupled in series with another MFCL 40. Alternatively, the MFCL 40 may be coupled in various series and parallel combinations.

Benefits of the present invention are evident. First, there will be negligible $i^2r$ losses during normal operation of an MFCL and will have no impact on normal system operation. Next, the present invention is modular for easy scalability and manufacturability because the basic fault current limiter 32 can be arranged in "m" (row)בn" (column) matrix configuration to accommodate various application requirements.

Also, a magnetic field is used to improve the quenching performance of superconductor 12, therefore overcoming non-uniformity normally existed within typical superconductor materials so that the entire volume of the superconductor 12 will quench simultaneously and uniformly, reducing the material burnout risks. In addition, an MFCL device is able to perform current limiting function without active fault sensing and limiting control mechanisms.

In summary, a short-circuit fault occurs within electrical generating system 10, such current flowing through superconducting element 12 exceeds its critical current level and causes superconducting element 12 to transition from its superconducting state to a resistive state. A current sharing regime develops when superconducting element 12 develops sufficient resistance and causes voltage drop across superconducting element 12. This voltage will then drives part of the fault current to both trigger coil 34 and parallel shunt 36. Because the trigger coil 34 is magnetically coupled to superconducting element 12, the current being driven into trigger coil 34 consequently generates a magnetic field which is uniform over the length of the superconductor 12. The trigger coil 34 design insures that superconducting element 12 is enveloped by a uniformed magnetic field. The magnetic field then causes superconducting element 12 to quench further and more quickly and to quench evenly through-out superconducting element 12, therefore reducing burnout risks associated with uneven heating or hot spots that may exist due to non-uniform regions within superconducting element 12. When the fault is removed fault current limiter 32 is cooled down and back below its critical temperature and returns to its normal state. The cooling is provided by cryocooling means designed with the overall fault current limiter device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A matrix fault current limiter having "m" (m>1) columns and "n" (n>1) rows, said MFCL comprising:
   at least one fault current limiter comprising a superconducting element electrically coupled in parallel with a non-switched trigger coil; a shunt electrically coupled in parallel with said superconducting element, wherein said non-switched trigger coil is magnetically coupled to said superconductoring element so as to generate a uniform magnetic field throughout the length of said superconducting element;
   wherein "n" number of said fault current limiter are electrically coupled in parallel to form one column;
   wherein "m" number of said columns are electrically coupled in series to form a "n" (row)×"m" (column) matrix; and
   wherein said matrix fault current limiter is coupled in parallel with at least one other matrix fault current limiter.

2. A matrix fault current limiter having "m" (m>1) columns and "n" (n>1) rows, said MFCL comprising:
   at least one fault current limiter comprising a superconducting element electrically coupled in parallel with a non-switched trigger coil; a shunt electrically coupled in parallel with said superconducting element, wherein said non-switched trigger coil is magnetically coupled to said superconductoring element so as to generate a uniform magnetic field throughout the length of said superconductoring element;
   wherein "n" number of said fault current limiter are electrically coupled in parallel to form one column;
   wherein "m" number of said columns are electrically coupled in series to form a "n" (row)×"m" (column) matrix,
   wherein said shunt is electrically coupled in parallel to said superconductoring element and said non-switched trigger coil; and
   wherein said matrix fault current limiter is coupled in parallel with at least one other matrix fault current limiter.

3. A fault current limiter comprising:
   a first superconducting assembly comprising a first superconducting element electrically coupled in parallel with a first shunt coil, wherein a predetermined value shunt impedance range is selected to limit current flow which results in heat losses within said first superconducting element during a fault condition;
   a second superconducting assembly comprising a second superconducting element electrically coupled in parallel with a second shunt coil, wherein a predetermined value shunt impedance range is selected to limit current flow which results in heat losses within said second superconducting element during a fault condition; and
   a non-switched trigger coil electrically coupled in parallel with said first and said second superconducting assembly.

4. The fault current limiter as recited in claim 3, further comprising "m" (m>1) columns and "n" (n>1) rows, wherein "n" number of said fault current limiter are electrically coupled in parallel to form one column; and
   wherein "m" number of said columns are electrically coupled in series to form a "n" (row)×"m" (column) matrix.

* * * * *